United States Patent
Shankar et al.

(10) Patent No.: US 12,460,969 B2
(45) Date of Patent: Nov. 4, 2025

(54) ELECTRONIC RING FOR MONITORING VITAMIN D LEVELS

(71) Applicant: ULTRAHUMAN HEALTHCARE PVT LTD, Karnataka (IN)

(72) Inventors: Apoorv Shankar, Bangalore (IN); Yogansh Namdeo, Karnataka (IN); Anoop Jayan, Bangalore (IN); Bhuvan Srinivasan, Bangalore (IN); Mohit Kumar, Bangalore (IN)

(73) Assignee: ULTRAHUMAN HEALTHCARE PVT LTD, Karnataka (IN)

( * ) Notice: Subject to any disclaimer, the term of this patent is extended or adjusted under 35 U.S.C. 154(b) by 0 days.

(21) Appl. No.: 19/048,650

(22) Filed: Feb. 7, 2025

(65) Prior Publication Data

US 2025/0216251 A1    Jul. 3, 2025

Related U.S. Application Data

(63) Continuation of application No. 18/861,272, filed as application No. PCT/IN2023/050410 on Apr. 27, 2023, now abandoned.

(30) Foreign Application Priority Data

Apr. 30, 2022    (IN) .............................. 202241019495

(51) Int. Cl.
*G01J 1/42* (2006.01)
*A61B 5/00* (2006.01)
(Continued)

(52) U.S. Cl.
CPC ............ *G01J 1/429* (2013.01); *A61B 5/6826* (2013.01); *A61B 5/7405* (2013.01); *A61B 5/742* (2013.01);
(Continued)

(58) Field of Classification Search
CPC ........ G01J 1/429; G01J 1/0204; G01J 1/0233; G01J 1/0271; G01J 1/0488;
(Continued)

(56) References Cited

U.S. PATENT DOCUMENTS

| 12,013,725 B2 * | 6/2024 | von Badinski | ......... H02S 40/22 |
| 2012/0326046 A1 * | 12/2012 | Aslam | ..................... G01J 1/429 |
| | | | 250/214 DC |

(Continued)

FOREIGN PATENT DOCUMENTS

AU    2022416518 A1 *   7/2024   ........... A61B 5/0006

OTHER PUBLICATIONS

International Search Report for Written Opinion for corresponding Application No. PCT/IN2023/050410, issued Jun. 14, 2023.
(Continued)

*Primary Examiner* — David P Porta
*Assistant Examiner* — Fani Polyzos Boosalis
(74) *Attorney, Agent, or Firm* — Renner, Otto, Boisselle & Sklar, LLP

(57) ABSTRACT

The proposed invention relates to an electronic ring for monitoring Vitamin D produced in a body of a user. The electronic ring comprises an Ultraviolet (UV) light sensor for determining a value of Ultraviolet B (UVB) radiation during exposure of sunlight on a body of a user. The electronic ring further comprises a microcontroller for determining an exposure time of the user to the sunlight. The microcontroller further determines an UVB dosage of the user based on a reciprocal of a product of the exposure time and a predefined weightage factor. The predefined weightage factor is associated with a wavelength of the UVB
(Continued)

radiation. The microcontroller further determines an amount of Vitamin D produced in the body of the user based on the UVB dosage of the user.

20 Claims, 5 Drawing Sheets

(51) Int. Cl.
*G01J 1/02* (2006.01)
*G01J 1/04* (2006.01)
*G01J 1/44* (2006.01)

(52) U.S. Cl.
CPC ............ *G01J 1/0204* (2013.01); *G01J 1/0233* (2013.01); *G01J 1/0271* (2013.01); *G01J 1/0488* (2013.01); *A61B 2560/0242* (2013.01); *A61B 2560/045* (2013.01); *A61B 2560/0462* (2013.01); *G01J 2001/0257* (2013.01); *G01J 2001/4276* (2013.01); *G01J 2001/446* (2013.01)

(58) Field of Classification Search
CPC ....... G01J 2001/0257; G01J 2001/4276; G01J 2001/446; A61B 5/6826; A61B 5/7405; A61B 5/742; A61B 2560/0242; A61B 2560/045; A61B 2560/0462
See application file for complete search history.

(56) References Cited

U.S. PATENT DOCUMENTS

| | | | |
|---|---|---|---|
| 2015/0102208 A1* | 4/2015 | Appelboom | G01J 1/4204 250/208.2 |
| 2019/0017866 A1 | 1/2019 | Sood et al. | |
| 2021/0242355 A1 | 8/2021 | Kotru et al. | |
| 2021/0364350 A1 | 11/2021 | Matthys | |
| 2023/0118495 A1* | 4/2023 | Kim | A61B 5/01 600/301 |

OTHER PUBLICATIONS

Adi Gaskell, "The Ring that Monitors your Vitamin D Levels," The Horizons Tracker, published on May 11, 2017, website: https://adigaskell.org/2017/05/11/the-ring-that-monitors-your-vitamin-d-levels/.

Michael Hemsworth, "The Helios Smart Ring Features a UV Sensor to Track Sun Exposure," Trend Hunter, published on Jan. 2, 2017, website: https://www.trendhunter.com/trends/uv-sensor.

* cited by examiner

ELECTRONIC RING FOR MONITORING VITAMIN D LEVELS

FIELD OF INVENTION

The present invention relates to monitoring of health parameters of a user by a wearable device, and specifically relates to monitoring Vitamin D levels of a user by a wearable device.

BACKGROUND

Vitamin D levels in the human body are essential for several reasons, including maintaining healthy bones, teeth and for protection against a range of diseases and conditions, such as type 1 diabetes. Sunlight is a major catalyst for building Vitamin D inside the body. During exposure to sunlight solar radiation with wavelengths of 290-315 nm penetrates into the skin and are absorbed by proteins, DNA and RNA as well as 7-dehydrocholesterol in the skin and is converted to pre-vitamin D3 which in turn isomerizes into vitamin D3. Vitamin D is metabolized sequentially in the liver and kidneys into 25-hydroxyvitamin D which is a major circulating form and 1,25-dihydroxyvitamin D which is the biologically active form respectively. 1,25-dihydroxyvitamin D plays an important role in regulating calcium and phosphate metabolism for maintenance of metabolic functions and for skeletal health. However, with advancement in technology and rapid lifestyle changes such as prevalence of remote working, a lot of people do not get enough sunlight, due to which a lot of people these days unknowingly suffer from Vitamin D deficiency. At the same time, excessive levels of vitamin D in the blood can cause nausea, vomiting, muscle weakness, pain, loss of appetite, dehydration, excessive urination, thirst, and kidney stones.

A major reason due to which such deficiency and excessiveness of Vitamin D levels in the user goes unnoticed is that there is no easy way to track Vitamin D levels in the body. Methods commonly implemented for measuring Vitamin D levels are invasive. At the same time, measurement of Vitamin D levels is expensive and universal testing of Vitamin D is not available.

Thus, there remains a need for a wearable device that monitors Vitamin D levels in a user in an efficient and cost-effective manner.

OBJECTS OF THE INVENTION

A general objective of the present invention is to provide a wearable device for measurement of Vitamin D levels in a user.

Another objective of the invention is to provide a cost-effective device for measurement of Vitamin D levels.

Yet another objective of the invention is to optimize a measurement of Vitamin levels for increasing accuracy of the measurement.

SUMMARY OF THE INVENTION

The summary is provided to introduce aspects related to an electronic ring for monitoring Vitamin D levels of users, and the aspects are further described below in the detailed description. This summary is not intended to identify essential features of the claimed subject matter nor is it intended for use in determining or limiting the scope of the claimed subject matter.

In one embodiment, an electronic ring for monitoring Vitamin D produced in a body of a user is disclosed. The electronic ring comprises an Ultraviolet (UV) light sensor for determining a value of Ultraviolet B (UVB) radiation during exposure of sunlight on a body of a user. The electronic ring further comprises a microcontroller for determining an exposure time of the user to the sunlight. The microcontroller further determines an UVB dosage of the user based on a reciprocal of a product of the sunlight exposure time and a predefined weightage factor. The predefined weightage factor is associated with a wavelength of the UVB radiation. The microcontroller further determines an amount of Vitamin D produced in the body of the user based on the UVB dosage of the user.

In one aspect, the UV light sensor gets activated when the electronic ring is worn by the user.

In one aspect, the UVB dosage of the user is optimized based on one or more of an age of the user and a gender of the user.

In one aspect, the UVB dosage of the user is optimized based on a height of the user, a weight of the user, and a type of clothes worn by the user during the exposure to the sunlight.

In an aspect, the type of clothes is selected by the user through a wireless electronic device.

In one aspect, wherein the electronic ring further comprises an optical filter positioned over the UV light sensor for passing the sunlight of a wavelength ranging from 290 nm to 315 nm.

Other aspects and advantages of the invention will become apparent from the following description, taken in conjunction with the accompanying drawings, illustrating by way of example the principles of the invention.

BRIEF DESCRIPTION OF THE DRAWINGS

The accompanying drawings constitute a part of the description and are used to provide further understanding of the present invention. Such accompanying drawings illustrate the embodiments of the present invention which are used to describe the principles of the present invention. The embodiments are illustrated by way of example and not by way of limitation in the figures of the accompanying drawings in which like references indicate similar elements.

It should be noted that references to "an" or "one" embodiment in this invention are not necessarily to the same embodiment, and they mean at least one. In the drawings.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Figure 1:
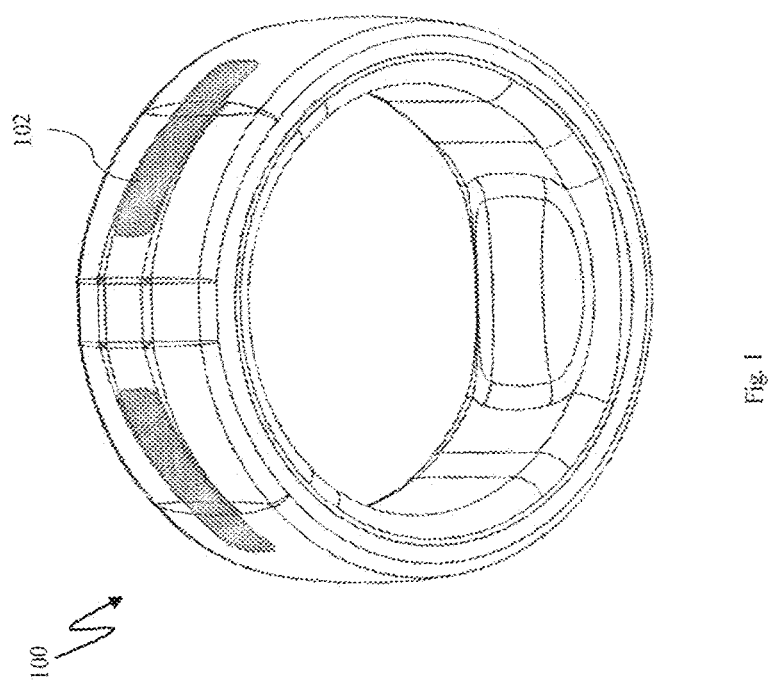
FIG. 1 illustrates a front perspective view of an electronic ring, in accordance with an embodiment of the present invention.

The proposed invention relates an electronic ring for monitoring Vitamin D levels of users. The electronic ring may be worn over a finger of a user. FIG. 1 illustrates a front perspective view of an electronic ring (100), in accordance with an embodiment of the present invention. The electronic ring (100) may be developed in different sizes to fit over different fingers of different users. The electronic ring (100) may include different sensors for monitoring the health parameters of users. In an implementation, the electronic ring (100) may include one or more ultraviolet (UV) sensors for monitoring Vitamin levels of a user. The one or more UV sensors are covered with an optical filter (102) for passing the sunlight of a particular wavelength, preferably from 290 nm to 315 nm. Types, placement, and working of the sensors used in the electronic ring (100) is described henceforth.

Figure 2:
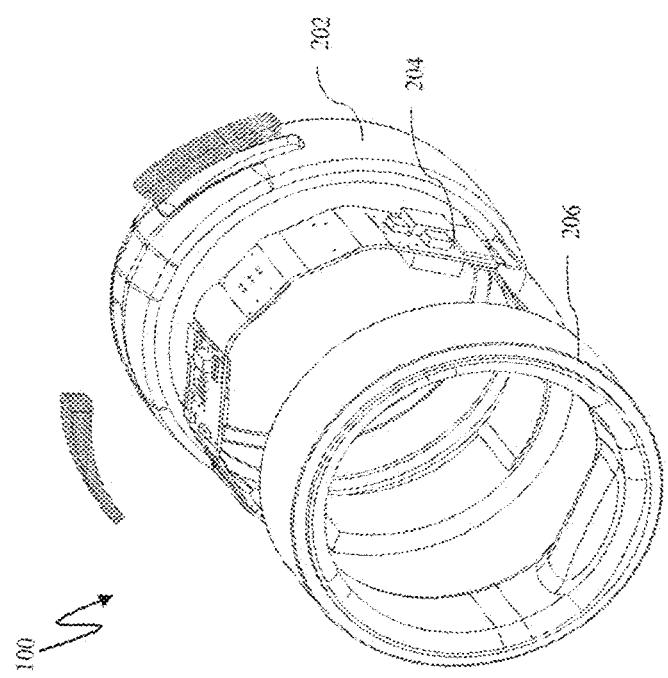
FIG. 2 illustrates an exploded view of an electronic ring having a multi-layered arrangement, in accordance with an embodiment of the present invention.

FIG. 2 illustrates an exploded view of the electronic ring (100) having a multi-layered arrangement, in accordance with an embodiment of the present invention. In a multi-layered arrangement, the electronic ring (100) may comprise an outer layer (202), a middle layer (204), and an inner layer (206). The outer layer (202) may be made of a rigid, antirust material. The middle layer (204) positioned between the outer layer (202) and the inner layer (206) may be a Printed Circuit Board (PCB) (204). The PCB (204) may be flexible, semi-flexible, or rigid. The PCB (204) may house one or more sensors to capture a plurality of health parameters of a user. The inner layer (206) of the electronic ring (100) positioned below the PCB (204) may come in contact of the user's finger once the user wears the electronic ring (100). The inner layer (206) may be made of a semi-transparent, translucent, or completely transparent, water-resistant material, such as glass, plastic, epoxy resin, or silicone.

Figure 3:
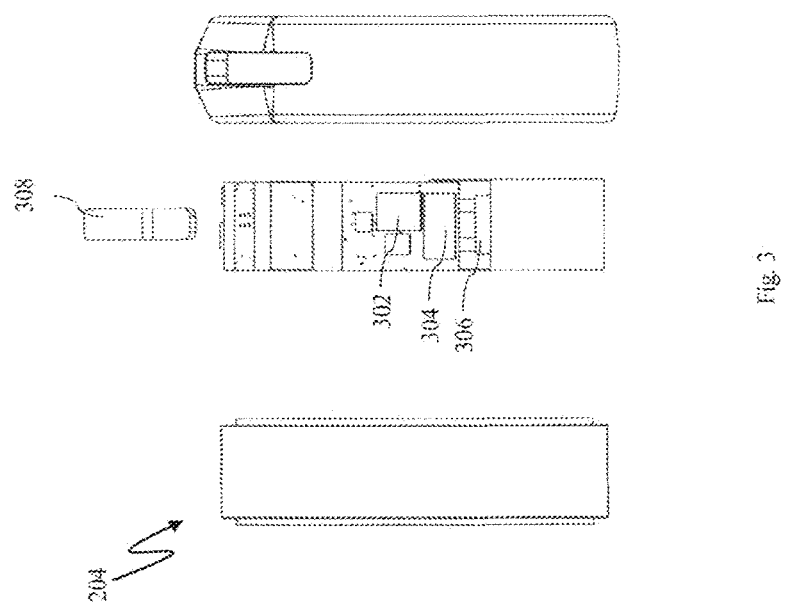
FIG. 3 illustrates a side view of a middle layer/PCB used in the electronic ring, in accordance with an embodiment of the present invention.
Figure 4:
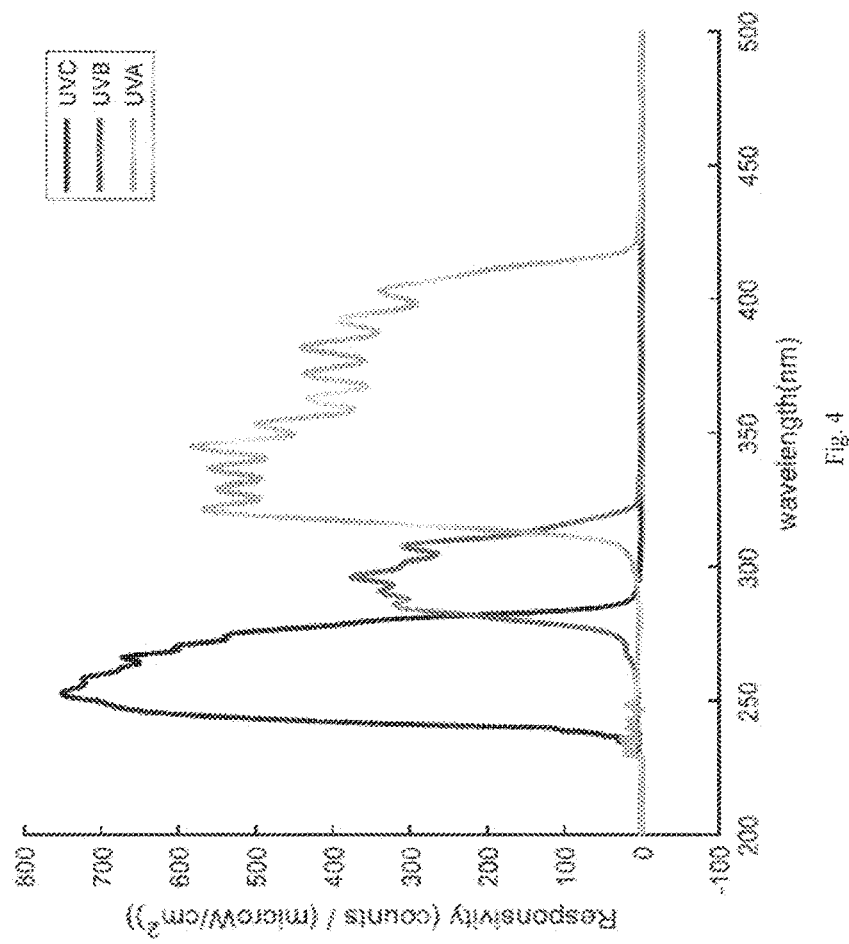
FIG. 4 illustrates responsivity vs. wavelength plot for different UV radiations, in accordance with an embodiment of the present invention.

FIG. 3 illustrates a side view of the middle layer i.e. the PCB (204), in accordance with an embodiment of the present invention. The PCB (204) may include a UV Light sensor (302). The UV Light sensor (302) may be an optical sensor used to capture values of intensity, frequency, and duration of sunlight (natural or created by artificial light sources) to which the user is exposed. One side of the UV Light sensor (302) faces surroundings of the user to detect sunlight through the outer layer (202). Another side of the UV Light sensor (302) is positioned to face the inner layer (206) to detect when the electronic ring (100) is in contact with the user, i.e. the electronic ring (100) is worn by the user. Alternatively, another optical sensor or a proximity/contact sensor may be used to determine if the electronic ring (100) is worn by the user. The UV Light sensor (302) may capture values of Ultraviolet B (UVB) radiation responsible for Vitamin D production only when it is determined that the electronic ring (100) is worn by the user. Responsivity of different UV radiations is measured to be different, as illustrated in FIG. 4. For example, a peak responsivity of UVA radiation is measured to be 600 microW/cm$^2$, a peak responsivity of UVB radiation is measured to be 400 microW/cm$^2$, and a peak responsivity of UVC radiation is measured to be 800 microW/cm$^2$. The sunlight may be received by the UV light sensor (302) through the optical filter (102) positioned over the UV light sensor (302). The UV light sensor (302) may have capability to measure and distinguish between the various frequencies in the UV Spectrum. The optical filter (102) may allow light of a wavelength ranging from 290 nm to 315 nm. The UV Light sensor (302) may include three or more internal photodiodes with different spectral sensitivities and Analog to Digital Convertors (ADCs). Each internal photodiode may be provided to a separate spectral photodetector.

A microcontroller (304) may be mounted on the PCB (204). The UV Light sensor (302) mounted on the PCB (204) may be connected to the microcontroller (304). The UV Light sensor (302) may transmit detected values of UVB radiation to the microcontroller (304), in real-time. The microcontroller (304) may obtain values of the UVB Radiation based on some internal and external triggers associated with the UV light sensor (302), such as when the user is identified to wear the electronic ring (100), during daytime, and/or sensor detects continuous UVB light intensity for predetermined amount of minimum time. The microcontroller (304) may also store the values of UVB radiation in a memory present in the electronic ring (100) or a separate memory element mounted on the PCB (204).

An intake of Vitamin D may be predicted based on a plurality of pre-defined data of the user stored in the memory. The plurality of pre-defined data of the user may include basic information, such as age of the user, gender of the user, height of the user, weight of the user, and type of clothes worn by the user during measurement of the Vitamin D levels. The type of clothes worn by the user may be classified based on the portions of the body exposed to direct sunlight. The data points may be obtained by an application developed to work with the electronic ring (100) and display all data points connected by the electronic ring (100). The application may be capable of being run on any portable or non-portable electronic device with a display facility and communication with the electronic ring (100).

For determining the Vitamin D level, an UVB dosage may be calculated based on the time of exposure to the UVB radiation to the user. The UVB dosage may be calculated using equation 1.

$$\text{Reciprocal of Dosage (cm}^2\text{/J) for } X \text{ nm} = \text{Time of exposure to } X \text{ nm wavelength radiation} * A \quad \text{(equation 1)}$$

In equation 1, X nm is a wavelength in a UVB spectrum and A is a weightage factor of a wavelength. Relation between the weightage factor A and the wavelength is provided in Table 1.

TABLE 1

| Wavelength in nm | A - Dosage in cm$^2$/J |
|---|---|
| 260 | 1 |
| 270 | 2 |
| 280 | 4 |
| 290 | 9 |
| 300 | 10 |
| 310 | 3 |
| 315 | 0.5 |

The UVB dosage calculated using equation 1 may be an ideal value and may be optimized using one or more parameters related to the user, such as age and skin tone of the user.

The UVB dosage may be optimized using equation 2.

Reciprocal of Dosage (cm²/J) for $X$ nm=Time of exposure to $X$ nm wavelength radiation*$A$*$B$ (equation 2)

In equation 2, B indicates an age factor. For example, B=1 for ages between 20 to 30, B=0.5 for ages between 30 to 50, and B=0.33 for ages between 60 to 80.

The UVB dosage may be further optimized by including changes in Vitamin D production based on skin tone of the user. High quantities of Melanin in the skin acts as a natural sunscreen and influences Vitamin D production. Higher the amount of melanin content, lower the amount of Vitamin D produced. In one implementation, the UV Light sensor (302) may identify the skin tone of the user. In another implementation, Photoplethysmography (PPG) sensor mounted at the inner surface of the electronic ring (100) detects skin contact with the user may also be able to classify user based on the "Fitzpatrick skin type scale" to add correction factors to the Vitamin D dosage calculated. The UVB dosage of the user is optimized using equation 3.

Reciprocal of Dosage (cm2/J) for $X$ nm=Time of exposure to $X$ nm wavelength radiation*$A$*$B$*$C$ (equation 3)

In equation 3, C indicates a skin type factor. For example, C=1 for Skin Type 1, C=0.5 for Skin Type 2, C=0.33 for Skin Type 3, C=0.25 for Skin Type 4, C=0.2 for Skin Type 5, C=0.167 for Skin Type 6

The Vitamin D level may be calculated by the UVB dosage using equation 4.

Vitamin $D$ production in IU=10,000 IU*(1/Reciprocal of Dosage (cm2/J)) (equation 4)

The PCB (204) may be connected with an external user device through a wireless module (306). The wireless module (306) may work on one or more of Bluetooth and Near Field Communication (NFC). The wireless module (306) may be mounted on the PCB (204) to wirelessly communicate the value of sunlight and Vitamin D produced to the external user device, such as a smartphone or a laptop. In an implementation, the user may select a type of cloth of the user worn during exposure to the sunlight. The external user device may act as a notification means for the user to access readings of the data in a visual or audible format. The notification means may also nudge the user to get more or less sunlight based on the daily readings.

In another implementation, the PCB (204) may be configured to connect with the external user device through a cloud based platform via a network.

A battery (308) may be used to power the UV Light sensor (302), the micro-controller (304), and the wireless module (306) in the electronic ring (100).

Figure 5A:
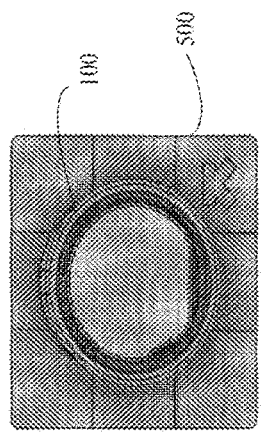
FIG. 5(a) illustrates a top view of the electronic ring placed on a wireless charger, in accordance with an embodiment of the present invention.
Figure 5B:
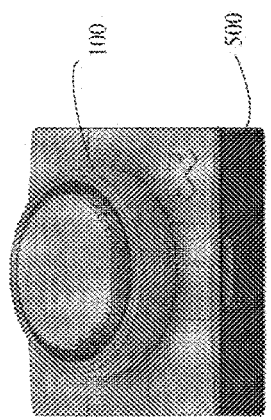
FIG. 5(b) illustrates a side view of the electronic ring placed on the wireless changer, in accordance with an embodiment of the present invention.

FIGS. 5(a) and 5(b) illustrate a top view and a side view respectively of the electronic ring (100) placed on a wireless charger (500), in accordance with an embodiment of the present invention. The electronic ring (100) may be wirelessly chargeable using the wireless charger (500). For wireless charging, the electronic ring (100) may comprise a wireless charging coil. The wireless charging coil may be positioned above or below the PCB (204). Electromagnetic field generated by a coil present in the wireless charger (500) may get coupled with the wireless charging coil of the electronic ring (100) when the electronic ring (100) is present above the wireless charger (500). Through coupling of the electromagnetic field, power may be received and stored in the battery (308). The wireless charger (500) may itself include a battery of capacity sufficient to charge the battery (308) of the electronic ring (100) a few times.

The electronic ring (100) may be worn by a user at all times so that his health and fitness parameters are continuously tracked and reported to him. The electronic ring (100) provides an accurate means for tracking and logging health parameters of a user in real time. With the data obtained from the electronic ring (100), a user may be able to track changes in his lifestyle, activities, and habits.

In the above detailed description, reference is made to the accompanying drawings that form a part thereof, and illustrate the best mode presently contemplated for carrying out the invention. However, such description should not be considered as any limitation of scope of the present unit. The structure thus conceived in the present description is susceptible of numerous modifications and variations, all the details may furthermore be replaced with elements having technical equivalence.

The invention claimed is:

1. An electronic ring for monitoring Vitamin D produced in a body of a user, the electronic ring comprising:
   an Ultraviolet (UV) light sensor for determining a value of Ultraviolet B (UVB) radiation during exposure of sunlight on a body of a user; and
   a microcontroller for:
      determining an exposure time of the user to the sunlight;
      determining an UVB dosage of the user based on a reciprocal of a product of the exposure time and a predefined weightage factor, wherein the predefined weightage factor is associated with a wavelength of the UVB radiation; and
      determining an amount of Vitamin D produced in the body of the user based on the UVB dosage of the user.

2. The electronic ring as claimed in claim 1, wherein the UV light sensor gets activated when the electronic ring is worn by the user.

3. The electronic ring as claimed in claim 1, wherein the UVB dosage of the user is optimized based on one or more of an age of the user and a gender of the user.

4. The electronic ring as claimed in claim 1, wherein the UVB dosage of the user is optimized based on a height of the user, a weight of the user, and a type of cloth worn by the user during the exposure to the sunlight.

5. The electronic ring as claimed in claim 4, wherein the type of cloth is selected by the user through a wireless electronic device.

6. The electronic ring as claimed in claim 1, wherein the electronic ring further comprises an optical filter positioned over the UV light sensor for passing the sunlight of a wavelength ranging from 290 nm to 315 nm.

7. The electronic ring as claimed in claim 1, wherein the microcontroller further calculates the Vitamin D level based on a skin type factor of the user classified using a Fitzpatrick skin type scale.

8. The electronic ring as claimed in claim 1, wherein the UV light sensor is configured to measure and distinguish between various wavelengths in the UV spectrum using internal photodiodes with different spectral sensitivities.

9. The electronic ring as claimed in claim 1, wherein the microcontroller stores historical data of UVB exposure and Vitamin D levels in a memory for trend analysis and user feedback.

10. The electronic ring as claimed in claim 1, wherein the electronic ring includes a wireless module for transmitting data related to UVB dosage and Vitamin D levels to an external user device.

11. The electronic ring as claimed in claim 10, wherein the external user device provides visual or audible feedback regarding the Vitamin D levels and nudges the user to adjust sunlight exposure based on the transmitted data.

12. The electronic ring as claimed in claim 10, wherein the external user device communicates with the electronic ring through a cloud based platform for monitoring and managing user data.

13. A method for monitoring Vitamin D levels in a body of a user using an electronic ring, the method comprising:
 determining, using an Ultraviolet (UV) light sensor, a value of Ultraviolet B (UVB) radiation during exposure of sunlight on the body of the user;
 activating the UV light sensor when the electronic ring is worn by the user;
 calculating, using a microcontroller, an exposure time of the user to the sunlight;
 determining a UVB dosage of the user based on a reciprocal of a product of the exposure time and a predefined weightage factor, wherein the predefined weightage factor is associated with a wavelength of the UVB radiation;
 calculating an amount of Vitamin D produced in the body of the user based on the UVB dosage;
 transmitting the UVB dosage and the calculated Vitamin D level to an external user device via a wireless module; and
 providing visual or audible feedback through the external user device based on the transmitted data.

14. The method as claimed in claim 13, wherein the UVB dosage is optimized using one or more user-specific parameters selected from the group consisting of age, gender, height, weight, skin type, and type of clothing worn during sunlight exposure.

15. The method as claimed in claim 14, further comprising the step of the user inputting data, including the type of clothing worn, into the external user device.

16. The method as claimed in claim 13, wherein the UV light sensor includes an optical filter configured to allow sunlight with a wavelength ranging from 290 nm to 315 nm to enhance UVB detection accuracy.

17. The method as claimed in claim 16, wherein the electronic ring communicates with the external user device via a cloud-based platform for data synchronization and remote monitoring.

18. The method as claimed in claim 13, further comprising the step of storing historical data of UVB dosage and Vitamin D levels in a memory within the electronic ring or the external user device for trend analysis.

19. The method as claimed in claim 13, wherein the external user device provides real-time notifications to the user, suggesting adjustments in sunlight exposure based on the calculated Vitamin D levels.

20. The method as claimed in claim 13, further comprising the step of the electronic ring wirelessly receiving updates or commands from the external user device to modify data collection settings.

* * * * *